United States Patent

[11] 3,633,203

| [72] | Inventors | Donald E. Kreinheder<br>Inglewood;<br>Paul A. Shaw, Malibu, both of Calif. |
|---|---|---|
| [21] | Appl. No. | 796,705 |
| [22] | Filed | Mar. 2, 1959 |
| [45] | Patented | Jan. 4, 1972 |
| [73] | Assignee | Hughes Aircraft Company<br>Culver City, Calif. |

[54] ANTENNA LOBING SYSTEM
14 Claims, 4 Drawing Figs.

[52] U.S. Cl. .................................................. 343/16 M,
343/16 LS, 333/7, 333/11
[51] Int. Cl. .................................................. G01s 9/22
[50] Field of Search............................................ 343/16.1,
16.2, 17.1, 5, 16 M, 16 LS; 333/1, 7, 11

[56] References Cited
UNITED STATES PATENTS

| 2,851,665 | 9/1958 | McCann........................ | 343/5 |
|---|---|---|---|
| | | FOREIGN PATENTS | |
| 797,367 | 7/1958 | Great Britain................ | 343/17.1 |

*Primary Examiner*—T. H. Tubbesing
*Attorneys*—James K. Haskell and Robert H. Himes CLAIM: 1. A monopulse system comprising: a monopulse antenna; a waveguide network coupled to the antenna and having sum, elevation and azimuth terminals; an energy-switching system for elevation and azimuth signals and including a pair of short-slot couplers, one of which has two input terminals coupled to the azimuth and elevation terminals of the waveguide network, and the other of which has two output terminals providing outputs from the switching system, the two short-slot couplers being connected between individual remaining terminals by a pair of transmission lines having a selected length relationship with respect to each other; a microwave hybrid junction coupled to one output terminal of the switching system; a transmission line coupling the sum terminal of the waveguide network to an input terminal of the hybrid junction and being of a selected length relationship with respect to the transmission lines in the switching system; and means for providing energy to be transmitted to the monopulse antenna in predetermined frequency steps which are selected with respect to the relative lengths of the transmission lines in the system.

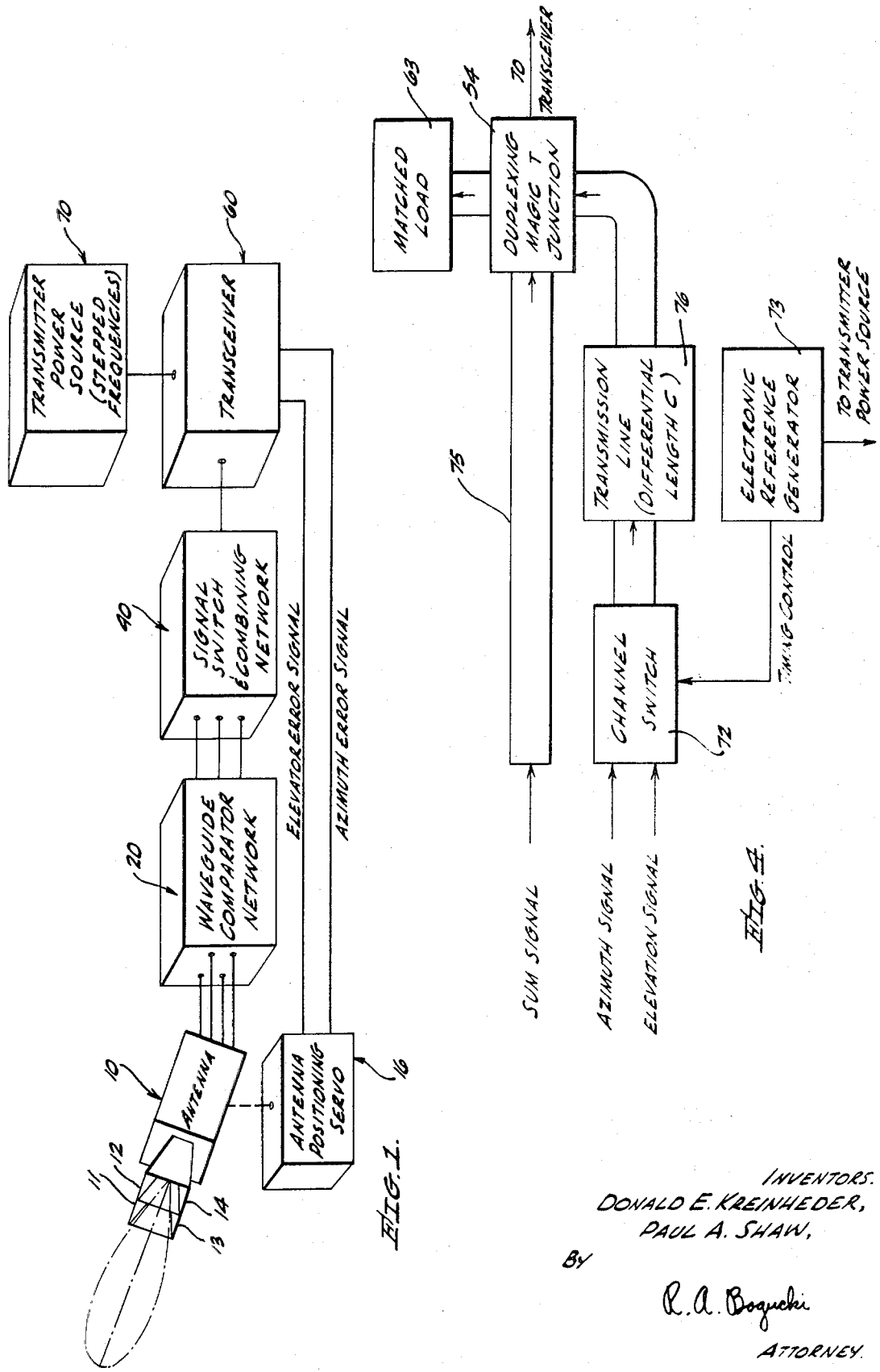

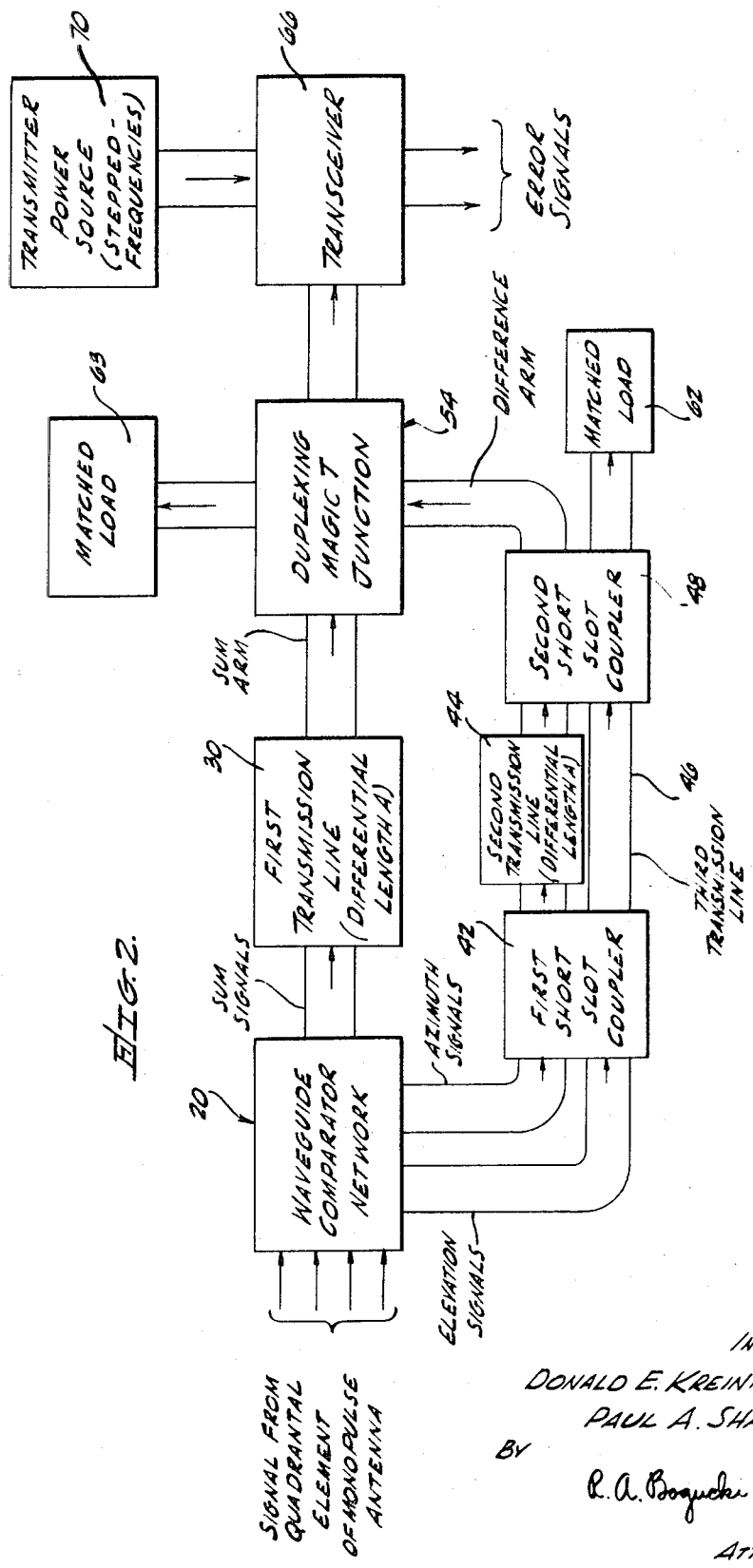

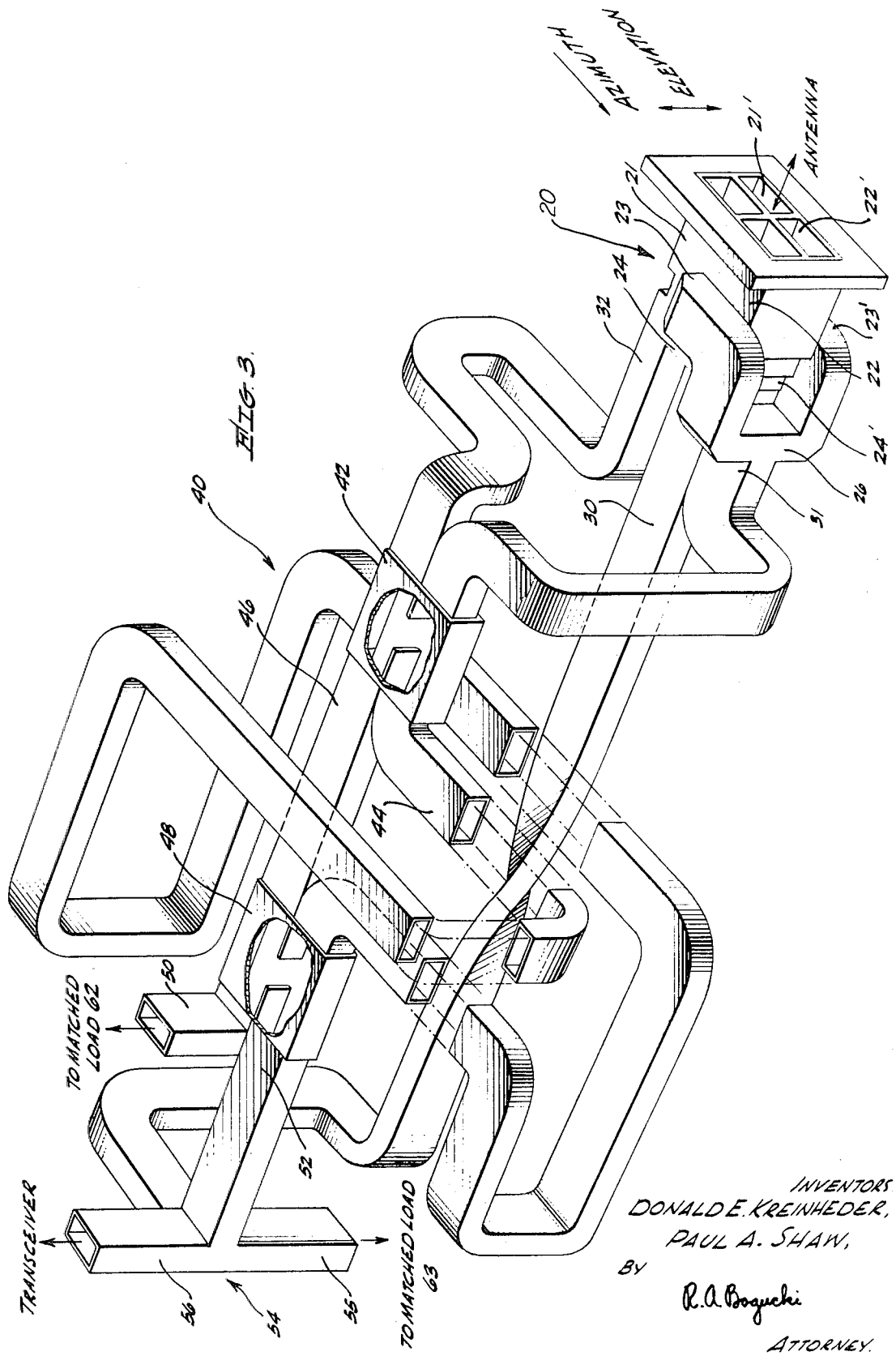

ANTENNA LOBING SYSTEM

This invention relates to systems which utilize lobing operation, and particularly to systems for electronic lobing with monopulse radars.

The object detection and location systems which are known as monopulse radars provide distance and direction information about objects by utilizing a transmitted beam and extracting both range and position information from energy reflected from the object. Usually, such systems employ quadrantally related radiating elements disposed about an axis of symmetry, sometimes called the boresight axis. For a beam transmitted along the axis, reflections from an object on the axis excite the elements of the antenna equally. An off-axis object, however, causes amplitude and phase differences in the energy exciting the antenna elements, and these differences are utilized to provide the position information. Although these systems may lobe on transmit, the present invention is concerned primarily with systems which utilize the same transmitted pattern sequentially and which utilize or lobe on the received signals so as to derive the desired position information. Because complete information about an object is derived through the use of successive signals, this may be known as a sequential lobing system.

Usually, in these systems, the energy which excites the separate antenna elements is directed through a comparator network which concurrently provides signals for both azimuth and elevation, as well as sum signals. The azimuth and elevation signals are utilized in the associated system to provide desired visual indications, control functions and information about the object. These signals are also employed to control the axial position of the antenna, so as to keep the antenna pointed in the direction of the object for example.

Heretofore, the systems for deriving and utilizing the azimuth and elevation signals in proper fashion have either been complex, or have had certain operational limitations, or both. Some systems, for example, have utilized separate receivers for each of the sum, azimuth and elevation signals. Such systems have not only required a great deal of equipment, but also have required that considerable attention be paid to the balance between the separate receivers. Other systems have utilized mechanical switching techniques with a single receiver, in order to utilize the received signals sequentially with the same receiver. Such systems, however, have sharply restricted the speed of the system and additionally have been relatively heavy.

A number of electronic lobing systems have therefore been employed. Such systems have tended to increase the speed and the repetition rate of the radars, and have accordingly increased the information rate and concurrently decreased scintillation effects. Here again, however, the switching techniques which have been employed have very often not been fast enough to provide the desired information rate. In some instances the electronic components employed have been subject to operational problems which have required the addition of complex circuitry to compensate in order to maintain accuracy. Thus these systems have heretofore not been capable of providing the desired speed of operation and also the desired accuracy.

It is therefore an object of the present invention to provide an improved monopulse system employing only a single microwave receiver.

It is a further object of this invention to provide a sequential lobing radar system capable of faster speeds of operation than the systems heretofore available.

Another object of this invention is to provide an improved system for deriving information from a monopulse antenna for application to a receiver.

Yet another object of this invention is to provide an improved electronic lobing system which is of more compact configuration than the previous comparable systems but which operates at extremely high repetition rates.

It is a further object of this invention to provide a stable electronic system for deriving elevation and azimuth information from the elements of a monopulse antenna.

These and other objects of the present invention are achieved by an electronic lobing system which utilizes frequency-sensitive elements and discretely differing frequencies to provide a sequential lobing operation. Signals received by the monopulse antenna are directed through a waveguide comparator to generate sum, elevation and azimuth signals. The elevation and azimuth signals are directed through a switching system which includes two different interconnecting lengths of waveguide transmission line and a pair of phase-sensitive couplers. The lengths of the transmission lines are selected with respect to each other and to the discretely differing transmitted frequencies so as to provide only one of the azimuth and elevation signals, depending upon the transmitted frequency, at a given output. These signals are in turn combined with the sum signal, again in a selected relationship because of selection of the relative lengths of the lines carrying the sum signals and the elevation or azimuth signals. The result is the provision of a sequence of individual signals for application to an associated receiver. The signals are arranged to contain complete information about the object being tracked. This arrangement is particularly uncomplicated and mechanically rugged. Because it does not utilize any active elements, it can operate at an extremely high rate of speed and furthermore is not subject to variations of power supply or the characteristics of individual elements.

The novel features of this invention, as well as the invention itself, both as to its organization and method of operation, may best be understood when considered in the light of the following description, when taken in connection with the accompanying drawings, in which like reference numerals refer to like parts, and in which:

FIG. 1 is a simplified block diagram representation of a system in which the present invention may be employed;

FIG. 2 is a block diagram of an arrangement in accordance with the invention, suitable for complete electronic lobing operation;

FIG. 3 is a simplified perspective view, partly broken away, of an arrangement for electronically lobing which may be employed for certain of the units of FIG. 2, and FIG. 4 is a block diagram representation of an arrangement in accordance with the invention for lobing in conjunction with electronic elements.

Monopulse Radar Systems   Electronic lobing may be achieving by an arrangement in accordance with the invention which operates in conjunction with a monopulse radar of the type indicated generally in FIG. 1. Referring now to that FIG., an antenna 10 for such a system may have four separate radiating elements 11 to 14 disposed symmetrically about a central axis. The radiating elements 11 to 14 are shown here as horn elements, but it will be understood that other elements, such as parabolic reflectors, may be used in addition, or that other antenna configurations may be employed. The horn radiators have been indicated for simplicity.

The radiating elements 11 to 14 are disposed quadrantally about the central or boresight axis, and thus form opposite pairs (11, 13 and 12, 14) about a central azimuth plane, and also opposite pairs (11, 12 and 13, 14) about an elevation plane, both of which planes intersect the central axis to define the quadrants. The terms "azimuth" and "elevation" are used with respect to the conventional position of the antenna 10 and also with respect to the signals which are generated, in order to establish planes of reference which make visualization of the operation easier. The terms are of course relative.

With the radiating elements 11 to 14 disposed as indicated, they may be described with respect to the azimuthal and elevation planes as the upper left element 11, the upper right element 12, the lower left element 13 and the lower right element 14. The antenna structure 10 may itself be freely movable in a gimballed or other structure, and couplings may be made to it through movable microwave joints or flexible waveguide couplings, the use of which will be understood, and the presence of which have been omitted for simplicity. Shifting of the central axis of the antenna 10 is accomplished by an antenna-positioning servo 16 operating under signals generated by the associated electronic equipment. As is described in more detail below, the antenna 10 is positioned, as in a tracking operation, to point in a desired direction. In the tracking operation, the antenna 10 is described at the object being tracked and error signals are generated to control the direction of point.

The antenna 10 generates four output signals on separate terminals, these output signals corresponding to the signals at the radiating elements 11 to 14. While the various transmission elements being described here and described in further detail below operate also during the transmit mode, it is perhaps easier to understand the operation of a present electronic lobing system in terms of the operation in the receive mode. Accordingly, the terms "output" and "input" as used herein designate the relative directions of propagation during the receiving mode of operation.

Signals from the antenna 10 are accordingly applied to a waveguide comparator network 20. Such comparator networks 20 have previously been employed in a number of monopulse radars, and one example is described in more detail below. Briefly, however, a comparator network, such as the waveguide comparator network 20, provides a number of energy division and combination functions in response to energy applied at its four input terminals. The net result is the provision of three outputs, one of which represents a sum signal, another of which represents an azimuth signal, and the other or which represents an elevation signal. Accordingly, these signals may be utilized with the associated system to provide indications of range and relative position of an object which provides an echo signal to the system.

The three outputs from the waveguide comparator network 20 are applied to a signal switching and combining network 40 which provides important functions in the combination of the present invention. The signal switching and combining network 40 is also described in more detail below, but provides, under control of the frequency being transmitted, only one of three signals applied as inputs to it. These outputs from the signal switching and combining network are applied to a radar transceiver 60, the term "transceiver" being utilized to designate those portions of the radar which provide the transmitting, indicating and various signal-generating functions of a monopulse radar system. The elements, and their manner of combination, which are used in the transceiver 60 may be any of those well known in the art. In accordance with the present invention, however, the transmitted frequencies are caused to vary in discrete steps in accordance with the considerations discussed in more detail below. Accordingly, a transmitter power source 70 may be employed with the transceiver 60 for generating stepped frequencies as selected values. In addition to providing indicating and control functions for visual inspection and for associated equipment (not shown) the transceiver 60 also provides elevation error signals and azimuth error signals to the antenna-positioning servo 16, in order to control the position of the central axis of the antenna 10 in accordance with signals applied to the transceiver 60.

Sequential Lobing   The signal sequence which is utilized to derive full positional information about the target is described in a copending application entitled "Wave Energy Tracking System," Ser. No. 658,915, filed May 1, 1957, by Donald E. Krienheder and assigned to the assignee of the present invention. As is therein described in greater detail, a sequence of four on-axis lobes is radiated from the antenna, and the received echoes are utilized to generate four different signals representing various combinations of the sum, azimuth and elevation signals. The time relationship of the sum signal to the transmitted pulse indicates the range of the target. The absolute amplitude of the azimuth and elevation signals, however, are not properly representative of the off-axis deviation because different objects reflect differently and because the signals necessarily decrease with distance. Therefore, the azimuth and elevation signals are separately combined with the sum signal, in order to use the sum signal as a reference.

The sequence used for the four signals consists of, first, the sum plus the elevation signal, second, the sum plus the azimuth signal, third, the sum minus the elevation signal and fourth, the sum minus the azimuth signal. This sequence provides, in effect, a sequential lobing operation. It further provides the azimuth and elevation signals as periodically varying signals in phase quadrature which may be utilized very simply in the associated receiver equipment.

Electronic Lobing System   The major elements which are utilized in conjunction with the antenna 10, the waveguide comparator network 20 and the transceiver 60 of FIG. 1 to provide electronic sequential lobing may be seen in FIG. 2, to which reference is now made. As seen therein, sum outputs from the waveguide comparator network 20 are coupled to a first transmission line 30. The first transmission line 30 is of selected length, the considerations which control this length being described more fully below. The elevation and azimuth terminals of the waveguide comparator network 20 are each coupled to the individual inputs of a first short-slot coupler 42. The type of microwave junction which is known as a "short-slot coupler" has two input and two output terminals, and performs the following functions. When energy is provided to the coupler at any one of its terminals, say an input terminal, the energy is split equally between the two opposite terminals. While equal in amplitude, this energy differs 90° in phase, the energy at the diagonal junction from the input lagging by 90°. When energy is applied in equal amplitudes but differs in phase to two like terminals, such as the input terminals, such inputs are directed toward a single one of the outputs, the output which is energized being dependent upon the sense of the phase difference. The energy is provided as output from the side in which it leads by 90°. The first short-slot coupler 42 thus provides these enumerated functions. For energies which are not separated by 90° in phase or equal in amplitude, short-slot couplers provide a variable power-splitting function, but such characteristics are not of particular significance in the present invention.

One output of the first short-slot coupler 42 is coupled to a second transmission line 44 having a specified length determined in accordance with more detailed considerations discussed below. The other output of the first short-slot coupler 42 is coupled to a straight-through third transmission line section 46. Both the second transmission line 44 and the third transmission line section 46 are coupled as inputs to a second short-slot coupler 48. This second short-slot coupler 48 is of like construction and has like operating characteristics to the first short-slot coupler 42. One output of the second short-slot coupler 48 is coupled to the difference arm of a magic tee hybrid junction 54, which performs a duplexing function in the present arrangement. The sum arm of the magic tee junction 54 is coupled to the first transmission line 30, while one output is coupled to the transceiver 60. The remaining output of the second short-slot coupler 48 is coupled to a matched load 62, which may be a resistive termination, for example. The remaining output of the duplexing magic tee junction 54 is also coupled to a matched load 63.

In operation, the arrangement of FIGS. 1 and 2 provides automatic lobing of the signals received at the antenna 10. Reference should be made to both FIGS. 1 and 2 for an understanding of the following. The sequence transmitted is that described above, of four successive pulses from the transmitter power source 70. While couplings to the antenna 10 from the source 70 have not been shown in detail, it will be understood that these signals are used to equally excite the radiating elements 11 to 14. Conventional TR tubes and switching devices (not shown) may be utilized for protection against high-energy pulses, if desired. In accordance with the present invention, the transmitted pulses vary in frequency in discrete selected steps.

During reception, however, the desired sequential lobing of the transmitted signals is accomplished automatically and with entirely passive elements. Each echo received excites the radiating elements 11 to 14 of the antenna 10 with energy having phase relationships dependent upon the displacement of the reflecting object from the antenna 10 axis. These four signals are applied to the waveguide comparator network 20, which in turn concurrently generates three different outputs, these being the sum signal, the azimuth signal and the elevation signal. It will be recalled that what is desired is to additively combine the sum signal first with the elevation signal and then with the azimuth signal, and then to subtractively combine the elevation signal with the sum signal and lastly the azimuth signal with the sum signal.

It is therefore necessary to switch alternately between the elevation and the azimuth signals, and this result is accomplished in a passive fashion by the relationship of the two short-slot couplers 42 and 48, the lengths of the second and third transmission lines 44 and 46, and the selected discrete frequencies which are transmitted. For a first of the frequencies, the relative lengths of the second and third transmission lines 44 and 46 are such that the elevation signal after being split in the first short-slot coupler 42 arrives at the second short-slot coupler 48 with a proper phase relationship between the energy in the second and third transmission lines 44 and 46 to result in the diversion of all this energy out the second short-slot coupler 48 to the magic tee junction 54. At the same time, the relative lengths of the lines 44 and 46 causes diversion of all the signal components due to the azimuth signal to the matched load 62.

For the next transmitted frequency in the sequence, the lengths of the second and third transmission lines 44 and 46 provide the proper electrical path length for switching out only the azimuth signal. Again the azimuth and elevation signals are split in the first short-slot coupler 42 and recombined in the second short-slot coupler 48. The electrical path length provided between the couplers 42 and 48, however, results in the proper phase relationships at the input to the second short-slot coupler 48 for the azimuth again only to be switched out and for the elevation signal to be directed into the matched load 62.

The third and fourth transmitted frequencies in the transmitting cycle cause similar alternating switching of the elevation and azimuth signals. Although the electrical path length is not changed, of course, the change in frequency causes the different phase relationships which are desired to effect the switching in a passive manner. Consequently, this switching between the elevation and azimuth signals may be considered to be automatic and is independent of the operation of the other elements.

Although the operation just described provides alternate elevation and azimuth signals, it is further necessary to provide a number of other functions in order to derive the desired phase quadrature outputs. These relationships are provided by the first transmission line 30, which has a selected length with respect to the electrical path length of the elevation and azimuth signals, and by the arrangement of the magic tee junction 54. In order for the elevation or azimuth signal in the difference arm of the magic tee junction to be additively combined with the signal in the sum arm, the signals must be applied in phase, so that their sum will be directed out the symmetry arms and to the transceiver 60. This relationship is established by the relative length of the first transmission line, which establishes the electrical path needed for proper relative phase shift of the sum signal with respect to the azimuth and elevation signal. This relationship is complicated by the additional consideration that the azimuth and elevation signals differ 90° in phase due to the properties of the short-slot couplers 42 and 48. Accordingly, the lengths of the transmission lines 30, 44 and 46 are selected in accordance with considerations discussed more fully below to provide the correct electrical path length for each frequency.

The result is that by merely switching the antenna between four different frequencies in a selected cycle, sequentially lobed signals are provided to the transceiver 60. The cycle may then be repeated with transmitted signals of the same frequency, or with a different series of frequencies.

Computation of Transmission Line Lengths We may now consider in further detail the manner in which the relationships of the lengths of the transmission lines 30, 44 and 46 and the transmitted frequencies may be determined.

As an example of the manner in which the calculations may be made, let it be assumed that the radiated energy is to fall in the frequency band between approximately 8,500 and 9,500 mc. Then it may also be assumed that the waveguide employed is 0.400 by 0.900 inches in inner dimensions.

For simplicity, the calculations may first be described with respect to a system in which elevation and azimuth signals are switched by other means, and which the function to be performed passively is first the addition and then the subtraction of the elevation and azimuth signals with the sum signal, in accordance with the sequence previously described.

In order for the signals to be alternatively added and subtracted, the frequencies should be such that first there is a 0° difference and then there is a 180° difference in the signals applied to the magic tee junction 54. If the arm which carries the elevation or azimuth signal is longer, by a length D, in working wavelengths, then the difference is phase $\Delta\phi$ between the two signals is $$\Delta\phi = 2\pi D/\lambda g$$

Where $\lambda g$ is the working wavelength in the arm or waveguide. In order for the 0° or 180° condition to hold, $\Delta\phi$ must satisfy the relation $$\Delta\phi = n\pi \, (n=0, 1, 2, 3 \text{ etc.})$$

substituting this expression in the previous expression gives $$2D/\lambda = n.$$

The frequencies may now be computed, for this example in which azimuth and elevation signals are separately applied, by selecting a value for D and taking successive integral values of $n$. It is desirable that the sum arm be as short as possible in coupling to the duplexing junction 54. Allowance must nonetheless be made for bends in the waveguide and the waveguide dimensions, as well as any electrical loading factors which might increase the electrical length. A value of D which has been found satisfactory and which takes these factors into account is approximately 69 cm.

With this value of D substituted into the above equations, the frequencies at which lobing would automatically be accomplished would be approximately, in the frequency range of interest, as follows:

8,515, 8,655, 8,795, 8,945, 9,095, 9,245, 9,400 and 9,555 mc.

This total of eight frequencies therefore means that four frequencies are available in each lobing direction. This may be considered to be lobing in a single plane, and an example of such an arrangement is shown in FIG. 4. For an electronically switched system, therefore, which selects the azimuth signal and then the elevation signal, the frequency shifts provide first addition and then subtraction of the signal from the sum signal.

In accordance with the present invention, however, and as shown diagrammatically in FIG. 2, the frequency shift lobing technique may concurrently provide selection between the azimuth and elevation signals and also alternate combination of the signals with the sum signals to provide sequential lobing. The important consideration as to switching of the azimuth and elevation signals is the differential electrical length A by which the second transmission line 44 is electrically longer than the third transmission line 46. To obtain frequency switching between the two outputs of the second short-slot coupler 48, the following relationship must apply for the differential length A:

$$2A/\lambda = n_1 \quad \text{(where } n_1 = 0, 1, 2, 3 \text{ etc.)}$$

This is the same as the relationship used in the simplified example above. If the elevation and azimuth signals are originally in phase, and if this relationship is observed and $n_1$ is zero or even in value, then the elevation signal will couple into the magic tee junction 54 and the azimuth signal will couple into the matched load 62. For odd values of $n_1$ the situation is reversed. Accordingly, the 69 cm. dimension may be again adopted as illustrative of a value suitable for providing the switching function with the selected 0.400 by 0.900-inch waveguide. The same frequencies also apply.

The successive outputs from the second short-slot coupler 48 further differ in phase by 90°. This phase difference in the alternate azimuth and elevation signals must be arranged properly with respect to the sum signal at the magic tee junction 54 to provide the desired sequence in the addition and subtraction of signals. If B is the differential electrical length of the sum channel with respect to the basic length in the switching section, the following relationship must be observed for lobing:

$$4B/\lambda = n_2 \quad (n_2 = 0, 1, 2, 3 \text{ etc.}).$$

Because $\lambda g$ is fixed by the above considerations for switching, the following relationship holds:

$$2A/n = 4B/n_2$$

Because the values of $n_1$ and $n_2$ are required to represent successive integers, the only way for the equation to be satisfied is for $n_1 = n_2$ and $B = A/2$. Thus, applying this to the situation previously discussed, if A, the differential electrical length for switching, is equivalent to 69 cm. of X-band waveguide, the differential electric length B for lobing will be approximately 34.5 cm. The result is the provision of eight lobed beams, covering two complete scan cycles, in the band from 8,500 to 9,600 mc. The frequencies utilized are those previously mentioned.

The fundamental relationships and the construction of this arrangement may be summarized with respect to FIG. 2. First, the lengths of transmission line 44 and 46 between the short-slot couplers 42 and 48 are given a differential length which effects switching between the outputs. Thus, as the frequency is shifted, the output from the second short-slot coupler 48 is first an elevation signal, then an azimuth signal, then an elevation signal again, and so on. Because of the operation of the couplers 42 and 48, however, there is a phase difference between the elevation and azimuth outputs from the second short-slot coupler 48 which is provided to the duplexing junction 54. This phase difference is inherently derived from the operation of short-slot couplers. It may be visualized by thinking of the azimuth signal as traveling straight through the short-slot couplers 42 and 48, and thus remaining in original phase, while the elevation signals must switch between one line and another, thus losing 90° in phase. These outputs are applied to the duplexing junction 54 along with the sum signals. The sum signals are concurrently adjusted in phase with respect to the phase of the output from the second short-slot coupler 48. This adjustment in phase is not simply an adjustment between zero and 180° but accounts for the difference in phase between the elevation and azimuth signals as well as for the desired addition and subtraction of signals which is to be accomplished in the duplexing junction. By satisfying the requirement that the differential length B be one-half that of the differential length A, changes in frequency concurrently change the phase shift in the first transmission line relative to the energy from the second short-slot coupler 48. We may thus establish the following table to show the relationship between the various signals.

represents the elevation and azimuth variations modulated in phase quadrature.

Detailed Electronic Lobing System    One manner in which the arrangement of FIGS. 1 and 2 may be constructed is shown in FIG. 3. For clarity in understanding the operation of this arrangement, each of the transmission lines used has been given its approximate relative dimension. While a number of techniques are available for effectively shortening a length of electrical line, these have not been illustrated in order to display graphically the relative lengths of electrical transmission line employed.

In FIG. 3, elements corresponding to the elements of FIG. 2 have been given like designations. The arrangement includes a waveguide comparator 20 which essentially consists of three folded magic tee hybrid junctions. A first of the magic tees may be referred to as an H-plane tee, in accordance with accepted terminology. They symmetry arms 21 and 22 of this first H-plane tee provide two of the inputs of the waveguide comparator 20. The sum arm 24 of the first H-plane tee forms one of the symmetry arms of a folded E-plane hybrid junction to be described below. Positioned as a mirror image to the first H-plane junction is a second H-plane junction having symmetry arms 21' and 22' which form the remaining inputs of the waveguide comparator 20. The sum arm 24' of the second H-plane junction forms the remaining symmetry arm of the E-plane junction. The two difference arms 23 and 23' of the two H-plane junctions are coupled together because they constitute the symmetry arms of a conventional tee junction 26. Particular compactness is obtained in this arrangement by folding the difference arms 23 and 23' flat on the surfaces of the H-plane junctions and then utilizing 90° bends in coupling to the tee junction 26.

The output arm of the tee junction 26 is the azimuth signal arm 31 from the waveguide comparator 20. The difference signals from the separate arms 21, 21', and 22, 22', are directed through the difference arms 23 and 23' of the H-plane junctions and combined in the tee junction 26 to form a single azimuth difference signal at the azimuth output terminal 31.

Sum signals are provided at the sum output terminal through the colinear arm in the E-plane junction whose symmetry arms are formed by the sum arms 24 and 24' of the H-plane junction. Thus the sum signals from all four of the input waveguides 21, 21', 22 and 22' of the waveguide comparator 20 are directed to the sum output terminal 30.

Elevation difference signals are derived from the difference terminal of the folded E-plane junction and are applied to the elevation signal terminal 32 of the waveguide comparator 20. In accordance with the operation of these hybrid junctions, the signals provided in the sum arms 24 and 24' of the folded H-plane junctions represent the two different elevation signals. The difference between these signals is derived in the difference arm of the folded E-plane junction and is applied as output from the elevation signal terminal 32. Again, compactness is obtained by bending the arm comprising the elevation signal terminal 32 parallel to the central axis of the comparator 20.

| Frequency | Output from second coupler 48 | Phase difference at second coupler 48 output, degrees | Phase of sum signal relative to in phase output at coupler 48, degrees | Output from hybrid junction 54 |
|---|---|---|---|---|
| $f_1$ | Elevation | −90 | −90 | Elevation+sum. |
| $f_2$ | Azimuth | 0 | 0 | Azimuth+sum. |
| $f_3$ | Elevation | −90 | +90 | Sum−elevation. |
| $f_4$ | Azimuth | 0 | +180 | Sum−azimuth. |

Thus the information provided is complete information about the target. The relative times of occurrence of the sum signal with respect to the transmitted signal represent the range of the target. By adding and then subtracting each of the elevation and azimuth signals from the sum signal in the duplexing junction 54, signals are provided which compensate for amplitude differences due to target range and size. In effect, the signals generated can provide a signal envelope which The remainder of the structure shown in FIG. 3 is the signal switching and combining network 40 shown in FIG. 1, and consists of the like elements of FIG. 2. The elevation and azimuth terminals 32 and 31 respectively of the waveguide comparator 20 are coupled to the inputs of the first short-slot coupler 42. One output of the first short-slot coupler 42 is coupled directly to one input of the second short-slot coupler 48 by the third transmission line section 46. The second output of the first short-slot coupler 42 is coupled by an extended length of waveguide forming the second transmission line 44. As pointed out above, the bends and long sections employed for these various waveguide elements are illustrated to give a visual representation of the relative electrical lengths of line which are employed, although these lengths are not drawn to scale. Considerably shorter sections may be employed at various points, by techniques well known in the art. The widths of the waveguides may be increased, for example, or dielectric loading may be employed to effectively change the path length.

One output 50 of the second short-slot coupler 48 is terminated in the matched load 62 (not shown in FIG. 3). The other output terminal 52 is coupled to the difference arm of the magic tee junction 54. The sum arm of the magic tee junction 54 is coupled through a waveguide section, here partially twisted to achieve proper coupling, which is an extension of the sum terminal 30 of the waveguide comparator 20. The azimuth and elevation signals separately provided in the output arm 52 are, in accordance with the operation of a magic tee junction such as the junction 54, vectorially combined with the signals in the sum arm. When the signals are in phase, half their sum is provided from the output arm 56 to the transceiver 60. The other half of the sum signal is provided out the other symmetry arm 55 to the matched load 63. This action is the converse of the usual operation in the magic tee junction, in which signals are applied to the symmetry arms and sum and difference signals taken from the correspondingly designated terminals in dependence upon the phase relationship of the signals applied to the symmetry arms. Correspondingly, when the signals applied to the sum and difference arms of the magic tee junction 54 are 180° out of phase, the elevation (or azimuth) signal is subtracted from the sum signal and only half this subtracted signal is applied to the transceiver 60, the remainder of the signal being directed to the matched load 63 as before.

The arrangement shown in FIGS. 1, 2 and 3 provides a number of operative and structural features which are of material advantage in operating antennas in sequential lobing fashion. All of the elements are passive, the only dynamic variable being the discrete changes in frequency. Consequently, variations in power supply and in timing characteristics of an associated system are of no concern. Further, however, important limitations on speed are completely eliminated by this arrangement. Mechanical and electronic switching devices need not be employed, and this further means that there is no need for drivers and programmers for the switching devices. The result is that the repetition rate of the system may be considerably increased. The information rate of the system is increased, scintillation effects are decreased, and the system may operate accurately at very close range. It has further been found that a considerable variation in the transmitted frequency may be sustained without materially affecting the lobing characteristics.

Single Channel System  The arrangement shown in FIG. 4 illustrates the manner in which a system similar to that of FIG. 2 may provide phase quadrature signals without utilizing frequency shift lobing for complete control. In the arrangement of FIG. 4, the same signal sequence is to be employed, but switching between the azimuth and elevation signal is accomplished by the use of a channel switch 72 controlled by an electronic reference generator 73 which also controls the timing of the power source (not shown) for the transmitted energy. This arrangement may still combine the azimuth and elevation signals additively or subtractively through the observance of the proper relationship between the transmitted frequency, the relative length of the line 75 carrying the sum signal and the relative length of the transmission line 76 carrying the difference signal. If the differential electrical length C between the two lines 75 and 76 is made such that successive frequencies provide alternately zero and 180° relative phase shift between the two signals applied to the magic tee junction 54, the desired operation is obtained. Such relationships are established by making the differential length C such that the previously stated relationship is observed $$2C/\lambda = n \quad (\text{where } n = 0, 1, 2, 3 \text{ etc.})$$

Thus it may be seen that the differential length follows the same relationship as set out above with respect to FIG. 2, and that if the same differential length (69 cm.) is employed in the frequency range of interest in the present example, the same frequencies may also be employed.

Thus there has been described an improved system for controlling the lobing of a monopulse radar. The system operates with high reliability and at high speed and with entirely passive elements.

We claim:

1. A monopulse system comprising: a monopulse antenna; a waveguide network coupled to the antenna and having sum, elevation and azimuth terminals; an energy-switching system for elevation and azimuth signals and including a pair of short-slot couplers, one of which has to input terminals coupled to the azimuth and elevation terminals of the waveguide network, and the other of which has two output terminals providing outputs from the switching system, the two short-slot couplers being connected between individual remaining terminals by a pair of transmission lines having a selected length relationship with respect to each other; a microwave hybrid junction coupled to one output terminal of the switching system; a transmission line coupling the sum terminal of the waveguide network to an input terminal of the hybrid junction and being of a selected length relationship with respect to the transmission lines in the switching system; and means for providing energy to be transmitted to the monopulse antenna in predetermined frequency steps which are selected with respect to the relative lengths of the transmission lines in the system.

2. An electromagnetic wave energy-switching system for additively and subtractively combining either of two signals with a reference signal and comprising: means, including a source of selected frequencies, for generating the three signals concurrently; phase-sensitive signal-coupling means responsive to the two signals and providing a pair of signal paths of differential length selected with respect to the selected frequencies; junction means having one terminal coupled to the signal-coupling means; and means providing a signal path of selected differential length with respect to the pair of signal paths and coupling the reference signals to another terminal of the junction means.

3. An electromagnetic wave energy-switching system for combining either of two information signals with a reference signal, each of the signals being derived from a common source, and said system comprising: a source of electromagnetic wave energy operating at discretely differing frequencies and providing the common source for the signals; a signal-switching system having differing electrical path lengths for portions of the two information signals to provide only one of the signals as output dependent upon the frequency of the source; and means including a member defining an electrical path length for selectively combining the output of the switching system with the reference signal dependent upon the frequency of the source.

4. A microwave switching system for selectively combining signals and comprising: a source of selected differing frequencies providing the signals to be combined; switching means responsive to more than one signal and including phase-sensitive elements and selected lengths of transmission line for providing single signal outputs dependent upon the frequency from the source; and signal-combining means for vectorially combining the single signal outputs with another signal in a sense dependent upon the frequency from the source.

5. A sequential lobing antenna system comprising: a monopulse antenna; a source of discretely differing frequencies coupled to a comparator network having sum, azimuth and elevation signal terminals coupled to the antenna, an energy-switching system coupled to the azimuth and elevation terminals and having transmission lines of different electrical path lengths for switching the azimuth and elevation signals in correspondence to the frequency; and a signal recombination device coupled to the switching system for combining the output from the sum terminal with individual outputs from the elevation and azimuth terminals.

6. A switching system for a monopulse radar including an antenna and comprising: a first microwave circuit responsive to signals from the antenna which are to be switched providing the signals alternately at an output; a second microwave circuit responsive to signals from the antenna and having a selected electrical length with respect to the first microwave circuit for providing reference signals; means for combining the outputs of the first and second microwave circuits; and a stepped frequency source of energy to be transmitted coupled to the antenna.

7. In combination with a monopulse antenna and a radar which includes a stepped frequency source, a switching system comprising a microwave circuit for switching alternately between two of the signals from the antenna; a transmission line element having a selected differential electrical length with respect to the microwave circuit and coupled to the antenna; and a microwave system for selectively combining the outputs of the microwave circuit and the transmission line element, the differential length selected providing additive and subtractive combination of the signals dependent upon the transmitted frequency.

8. A system for sequential lobing with a monopulse antenna and comprising: a source of wave energy for transmission, the source providing a cyclic sequence of discretely differing frequencies; a wave energy switching system responsive to information signals from the antenna and including energy couplers and at least a pair of transmission lines of differing electrical lengths, the relative lengths being selected to provide alternating ones of the information signals as outputs depending upon the frequency transmitted in the cycle; a transmission line section having a selected differential electrical length with respect to the transmission line section of the switching system and coupled to the antenna for providing a reference signal whose phase relation to the outputs alternate with successive like outputs; and a microwave hybrid junction coupled to the switching system and the transmission line section.

9. An electronically lobed antenna comprising: a group of four symmetrically disposed elements; a waveguide comparator network coupled to the antenna for providing therefrom individual sum, azimuth error and elevation error signals on separate terminals; a first phase selective energy coupler coupled to the elevation and azimuth terminals; energy transmission lines of selected lengths coupled to the first coupler, there being a selected relation between the lengths of the transmission lines; a second wave energy coupler coupled to the transmission lines and recombining energy therefrom; a microwave junction having one input coupled to the sum terminal of the comparator network and the remaining terminal coupled to a given terminal of the second coupler; and transmitter means coupled to said antenna for transmitting signals to be received in discretely stepped frequencies having a selected relation to the electrical path length of the energy transmission lines.

10. An electronic lobing system for providing lobing of received energy in a monopulse radar, said system comprising: a source of discretely differing frequencies to be transmitted; an antenna coupled to the source; a waveguide comparator network coupled to the antenna and providing sum, azimuth and elevation signals; an energy-switching system responsive to the elevation and azimuth signals and including means providing selected electrical path lengths having a selected relationship to the transmitted frequencies; a hybrid junction having one terminal coupled to the switching means; and means including a transmission line of selected electric path length coupling sum signals from the waveguide comparator network to another terminal of the hybrid junction, outputs being taken from yet another terminal of the hybrid junction.

11. A waveguide system for operation with a monopulse system which includes a four-port antenna and a source of discretely differing frequencies, said system comprising: a seven-terminal waveguide comparator structure having four terminals coupled individually to different ones of the four ports of the antenna and three parallel and adjacent terminals extending therefrom in the opposite direction and including respectively a sum signal terminal, an azimuth signal terminal, and an elevation signal terminal; an azimuth and elevation signal switching network comprising a first short-slot coupler having two input terminals coupled to the elevation and azimuth signal terminals respectively, a second short-slot coupler having two input terminals an two output terminals, a first waveguide transmission line of selected length coupling the first output terminal of the first short-slot coupler to the first input terminal of the second short-slot coupler, a second waveguide transmission line coupling the second output terminal of the first short-slot coupler to the second input terminal of the second short-slot coupler, the second waveguide transmission line being longer in length than the first waveguide transmission line and having a length differential determined by the discrete frequency differences provided by the frequency source; a hybrid junction; a third waveguide transmission line coupling the sum signal terminal to the sum arm of the hybrid junction, the third waveguide transmission line having a length which is selected with respect to the length of the second waveguide transmission line, and determined by the discrete frequency steps of the frequency source; a fourth waveguide transmission line coupling the first terminal of the second short-slot coupler to the difference arm of the hybrid junction; and a pair of waveguide terminations, one of which is coupled to the second output terminal of the second short-slot coupler and the other of which is coupled to a symmetry arm of the hybrid junction, such that outputs are provided from the remaining symmetry arm of the hybrid junction.

12. Means for determining the direction from whence electromagnetic energy of a plurality of different frequencies is coming, said means comprising antenna means having a plurality of lobes which overlap each other along a pair of planes orthogonal to each other, means operatively interconnected with said antenna means responsive to energy of at least one of said frequencies and effective to indicate which side of one of said planes said energy is coming from, and means operatively interconnected with said antenna means and responsive to energy of at least one of the other of said frequencies to indicate which side of the other of said planes said energy is coming from.

13. A monopulse radar system comprising, the combination of means for illuminating a target area with electromagnetic energy having a plurality of discretely different frequencies, antenna means for receiving said electromagnetic energy returned from said target area, said antenna means having a plurality of lobes which overlap each other along a pair of planes orthogonal to each other, means operatively interconnected with said antenna means and responsive to energy of at least one of said discrete frequencies and effective to indicate which side of one of said planes said energy is coming from, and means operatively interconnected with said antenna means and responsive to energy of at least one of the other of said frequencies to indicate which side of the other of said planes said energy is coming from.

14. A monopulse radar system comprising, the combination of means for illuminating a target area with electromagnetic energy having a plurality of discretely different frequencies, antenna means for receiving electromagnetic energy returned from said target area, said antenna means having a plurality of lobes which overlap each other along a pair of planes orthogonal to each other, a summing and differencing network operatively interconnected with said antenna means for receiving energy of said frequencies therefrom, said network having a plurality of frequency-responsive outputs whereby each of said outputs will discharge energy of only one of said frequencies therefrom whereby the position of a target in said area with respect to said common planes may be determined.

* * * * *